US009217875B1

(12) United States Patent
Huang

(10) Patent No.: US 9,217,875 B1
(45) Date of Patent: Dec. 22, 2015

(54) MULTI-VIEW AUTO-STEREOSCOPIC DISPLAY AND ANGLE MAGNIFYING SCREEN THEREOF

(71) Applicant: DELTA ELECTRONICS, INC., Taoyuan (TW)

(72) Inventor: June Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 14/697,187

(22) Filed: Apr. 27, 2015

(30) Foreign Application Priority Data

Oct. 29, 2014 (TW) .............................. 103137347 A

(51) Int. Cl.
| G02B 27/22 | (2006.01) |
| G03B 21/625 | (2014.01) |
| G03B 35/22 | (2006.01) |
| G02B 3/00 | (2006.01) |
| G02B 13/16 | (2006.01) |

(52) U.S. Cl.
CPC .......... *G02B 27/2214* (2013.01); *G02B 3/0056* (2013.01); *G02B 3/0068* (2013.01); *G02B 13/16* (2013.01); *G02B 27/2221* (2013.01); *G03B 21/625* (2013.01); *G03B 35/22* (2013.01)

(58) Field of Classification Search
CPC .......... G02B 27/2214; G02B 27/2221; G02B 3/0056; G02B 3/0068; G02B 13/16; G03B 21/625; G03B 35/22
USPC ....................................................... 359/458
See application file for complete search history.

(56) References Cited

U.S. PATENT DOCUMENTS

| 5,719,706 A * | 2/1998 | Masumoto ........... G02B 3/0056 348/E5.141 |
| 6,278,546 B1 | 8/2001 | Dubin et al. |
| 7,088,508 B2 | 8/2006 | Ebina et al. |
| 7,425,070 B2 * | 9/2008 | Hsu ...................... G03B 21/625 348/E13.027 |
| 7,894,419 B2 | 2/2011 | Turpin et al. |
| 7,944,465 B2 | 5/2011 | Goulanian et al. |

FOREIGN PATENT DOCUMENTS

TW 459145 B 10/2001

OTHER PUBLICATIONS

Takahiro Ishinabe, et al., "High-Resolution Floating Autostereoscopic 3D Display Based on Iris-Plane-Dividing Technology", SID 2012 Digest, 2012, pp. 225-228.

(Continued)

*Primary Examiner* — Christ Mahoney
(74) *Attorney, Agent, or Firm* — Muncy, Geissler, Olds & Lowe, P.C.

(57) ABSTRACT

A multi-view auto-stereoscopic display is provided. The display includes an angle-magnifying screen for magnifying the view angle of an image light beam from a projection head. The angle-magnifying screen includes a first lens unit, a central lens unit, and a second lens unit arranged sequentially. The first lens unit is configured for receiving the image light beam. The central lens unit is configured for redirecting the image light beam from the first lens unit to the second lens unit. The second lens unit is configured for magnifying the view angle of the image light beam.

13 Claims, 6 Drawing Sheets

(56) References Cited

OTHER PUBLICATIONS

Lawrence Bogaert, et al., "Demonstration of a multiview projection display using decentered microlens arrays", Optics Express, vol. 18, No. 25, Nov. 30, 2010, pp. 26092-26106.

Tsubasa Kanebako, et al., "Time-Multiplexing Display Module for High-Density Directional Display", Stereoscopic Displays and Applications XIX, SPIE-IS&T Electronic Imaging, vol. 6803, pp. 68030P-1-68030P-8.

* cited by examiner

MULTI-VIEW AUTO-STEREOSCOPIC DISPLAY AND ANGLE MAGNIFYING SCREEN THEREOF

CROSS REFERENCE TO RELATED APPLICATIONS

This Application claims priority of Taiwan Patent Application No. 103137347, filed on Oct. 29, 2014, the entirety of which is incorporated by reference herein.

BACKGROUND

1. Field of the Invention

The present invention relates to a display device and optical elements thereof, and more particularly to a multi-view auto-stereoscopic display and an angle-magnifying screen thereof.

2. Description of the Related Art

To obtain more vivid and realistic images, display technologies have developed in succession over recent years to satisfy the demands of viewers. In contrast to early-stage flat panel displays mainly focused on the improvement of resolution and color, the three-dimensional (3D) display apparatuses of recent years have sought to provide viewers with a vivid stereoscopic display effect.

The stereoscopic displaying effect is achieved primarily by feeding different viewing angles of an object to the left and right eyes respectively. According to the characteristics of human vision, when the left and right eyes simultaneously receive two images with the same image content but different parallaxes, a 3D image of an object with a sense of level and depth will be perceived by the viewer. In practice, 3D images are generally accomplished either through the use of glasses or by viewing with the naked eye; technical developments over recent years have focused on the latter.

According to the characteristics of human vision, when the two eyes of a human being are watching the same image at the same time, the images seen by the two eyes are slightly different because of the spacing of about 65 mm between the two eyes. Thus, a three-dimensional (3D) image is obtained. The 3D display technologies may be categorized into stereoscopic display technologies and auto-stereoscopic display technologies. According to the imaging methods used, the auto-stereoscopic display technologies are further divided into the spatial-multiplexing auto-stereoscopic display technology, and the time-multiplexing auto-stereoscopic display technology.

However, there are still shortcomings and problems to be overcome either for the spatial or time multiplex method. Accordingly, it is highly desirable for manufacturers in the art to develop a novel stereoscopic display apparatus.

SUMMARY

One objective of the present invention is to provide a multi-view auto-stereoscopic display, in which image contents are produced by a light source element, and an angle-magnifying screen is positioned on the optical transmission path of the image contents to magnify the view angle of image, so as to meet demands for end product.

According to one embodiment of the disclosure, the multi-view auto-stereoscopic display includes a projection lens configured to receive an image light beam and an angle-magnifying screen configured to receive the image light beam from the projection lens. In some embodiments, the angle-magnifying screen includes a first lens unit, a second lens unit, and a central lens unit. The first lens unit includes a plurality of first lenticular lenses each having a first focal length. The first lenticular lenses are arranged along a predetermined direction and are separated from one another by a first distance. The second lens unit includes a plurality of second lenticular lenses each having a second focal length. The second lenticular lenses are arranged along the predetermined direction and are separated from one another by a second distance. The central lens unit is positioned between the first lens unit and the second lens unit and separated from the first lens unit by a distance of the first focal length. The central lens unit includes a plurality of central lenticular lenses each having a third focal length, and the central lenticular lenses are arranged along the predetermined direction and separated from one another by a third distance. The third distance satisfies the following equation:

$$P_M = \frac{P_A}{TD} \times (TD + f_a - f_m)$$

in which $P_M$ is the third distance, $P_A$ is the first distance, TD is a projection length of the image light beam from the projection lens to the angle-magnifying screen, $f_a$ is the first focal length, and $f_m$ is the third focal length In some embodiments, the second distance satisfies the following equation:

$$P_B = \frac{P_A}{N} * \frac{(TD + f_a)}{TD}$$

in which N is a natural number greater than or equal to 1.

In the above-mentioned embodiments, the first lenticular lenses include a first axial lens, and the second lenticular lenses include a second axial lens, wherein the optical axis of the first axial lens and the optical axis of the second axial lens are arranged in a main axis.

In the above-mentioned embodiments, along the predetermined direction, the first lens unit includes X first lenticular lenses counting from the first one of the first lenticular lenses which is adjacent to the first axial lens. Along the predetermined direction, the second lens unit includes X second lenticular lenses counting from the first one of the second lenticular lenses which is adjacent to the second axial lens. The optical axis of a Y-th second lenticular lens is offset from the optical axis of a Y-th first lenticular lens by a shifting value, and the shifting value satisfies the following equation:

$$O_Y = Y*[P_B*N - P_A]$$

in which Oy is the shifting value, Y is smaller than or equal to X, and N is a natural number greater than or equal to 1.

In some embodiments, a projection length of the image light beam from the projection lens to the angle-magnifying screen satisfies the following equation:

$$TD \geq f_a / O_Y * W/2$$

in which W is a width of the first lens unit along the predetermined direction.

In some embodiments, the first focal length equals to the third focal length.

In some embodiments, the first focal length is greater than the second focal length.

In some embodiments, the central lens unit is spaced from the second lens unit by a distance of the second focal length.

In some embodiments, the angle-magnifying screen further includes a plurality of light blocking elements each positioned between the two neighboring lenticular lenses.

In some embodiments, the first lens unit and the central lens unit are formed integrally. In some embodiments, angle-magnifying screen includes a plurality of second lens units, and the second lens units are adjacent to one another along the predetermined direction. The first lenticular lenses are arranged at a light receiving side (i.e., at a side close to the projection lens) of the angle-magnifying screen, and the central lenticular lenses are arranged at an emitting side (i.e., at a side away from the projection lens) of the angle-magnifying screen.

In some embodiments, the angle-magnifying screen includes a plurality of second lens units, and the second lens units are adjacent to one another along the predetermined direction.

BRIEF DESCRIPTION OF THE DRAWINGS

For a more complete understanding of the embodiments, and the advantages thereof, reference is now made to the following descriptions taken in conjunction with the accompanying drawings.

DESCRIPTION OF THE ILLUSTRATIVE EMBODIMENTS

In the following descriptions, a multi-view auto-stereoscopic display of the present invention will be explained with reference to embodiments thereof. It should be appreciated that these embodiments are not intended to limit the present invention to any specific environment, applications or particular implementations described in these embodiments. Therefore, the description of these embodiments is only for the purpose of illustration rather than to limit the present invention. Furthermore, the attached drawings may be drawn in a slightly simplified or exaggerated way for ease of understanding; the numbers, shapes and dimensional scales of elements depicted may not be exactly the same as those in practical implementations and are not intended to limit the present invention.

Figure 1:
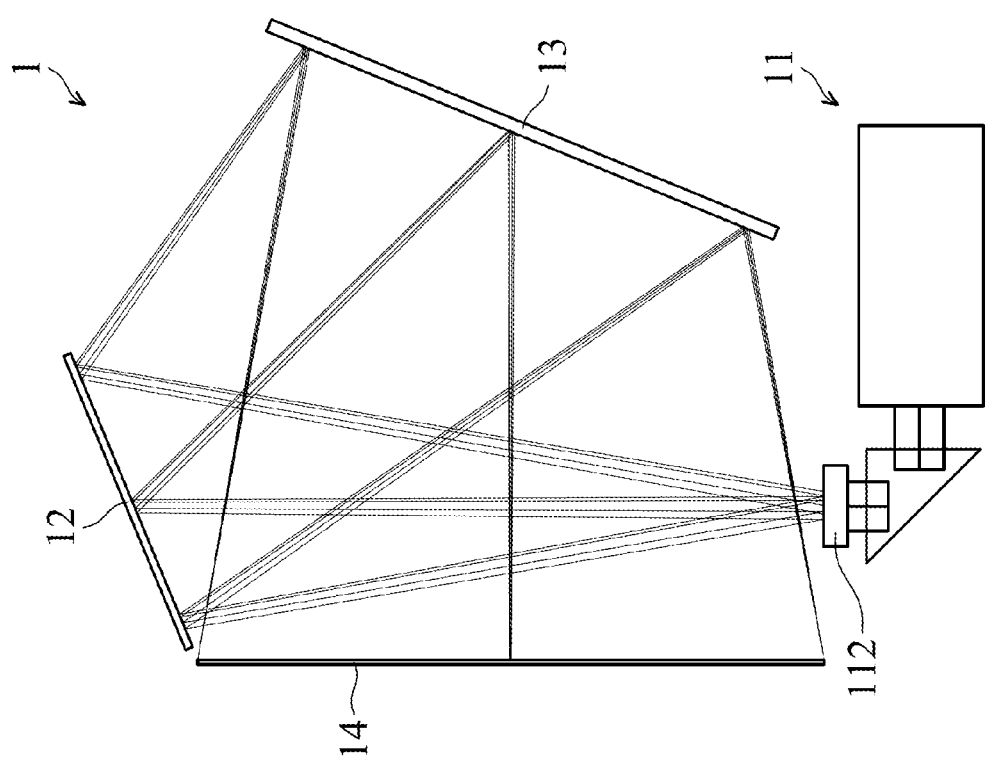
FIG. 1 shows a schematic view of a multi-view auto-stereoscopic display, in accordance with some embodiments.

FIG. 1 shows a schematic view of a multi-view auto-stereoscopic display 1, in accordance with some embodiments. In some embodiments, the multi-view auto-stereoscopic display 1 includes a light source module 11, a number of light path adjusting members, such as light path adjusting members 12 and 13, and an angle-magnifying screen 14. It should be appreciated that the elements of the multi-view auto-stereoscopic display 1 can be added to or omitted, and the disclosure should not be limited by the embodiments.

Figure 2:
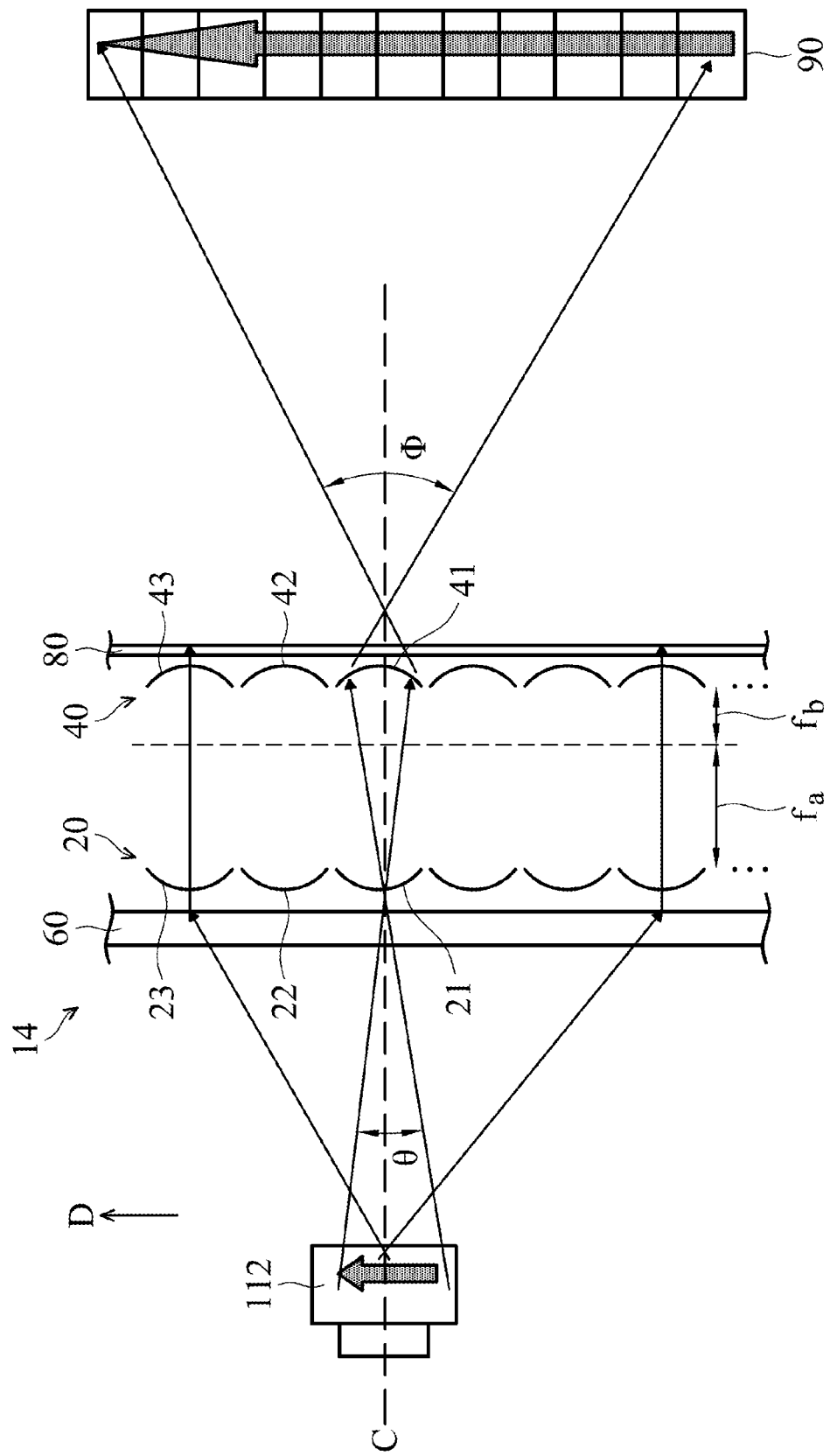
FIG. 2 shows a structural schematic view of a portion of a multi-view auto-stereoscopic display, in accordance with some embodiments.

In some embodiments, with reference of FIG. 2, the light source module 11 produces an image light beam according to image data. The image light beam is transmitted along a main axis C via the projection lens 112, the light path adjusting member 12 and 13, and the angle-magnifying screen 14 and projected to the viewing area 90 for viewers to watch an image. In some embodiments, each pixel of the image produced by the multi-view auto-stereoscopic display 1 consists of a number of image pixels in different directions (such as 15 directions), such that a light field is created, and the image is observable in different directions. Since the method for producing an image light beam by the light source module 11 is well within the knowledge of one skilled in the art, further elaboration will not be presented here regarding the light source module 11.

FIG. 2 shows a structural schematic view of a portion of the multi-view auto-stereoscopic display 1, in accordance with some embodiments. It should be noted that a portion of the angle-magnifying screen 14 is not shown in FIG. 2. In some embodiments, the angle-magnifying screen 14 includes a Fresnel lens 60, a first lens unit 20, a second lens unit 40, and a vertical diffuser 80 arranged sequentially along the main axis C. The Fresnel lens 60 is used to direct the image light beam to be transmitted along the main axis C. The first and second lens units 20 and 40 are used to magnify the viewing angle of the incident light beam. The vertical diffuser 80 is used to diffuse the light so as to increase image quality.

In some embodiments, the first lens unit 20 includes a plurality of first lenticular lenses, such as first lenticular lenses 21, 22, and 23, arranged along a predetermined direction D. Each of the first lenticular lenses 21, 22, and 23 has a first focal length $f_a$ and is projected toward a light-receiving side of the angle-magnifying screen 14. The second lens unit 40 includes a plurality of second lenticular lenses, such as second lenticular lenses 41, 42, and 43, arranged along the predetermined direction D. Each of the second lenticular lenses 41, 42, and 43 has a second focal length $f_b$. In some embodiments, the number of first lenticular lenses equals the number of pixels of the multi-view auto-stereoscopic display 1 (such as 1920*1080). In addition, the number of second lenticular lenses equals the number of pixels of the multi-view auto-stereoscopic display 1. As a result, the optical characteristics of each pixel of the multi-view auto-stereoscopic display 1 are adjusted independently.

In some embodiments, the distance between the two neighboring first lenticular lenses 21, 22, and 23 equals the distance between the two neighboring second lenticular lenses 41, 42, and 43. Therefore, the optical axes of the first lenticular lenses 21, 22, and 23 respectively align with the optical axes of the second lenticular lenses 41, 42, and 43. In some embodiments, the first lenticular lens and the second lenticular lens which are arranged on the same optical axis cooperatively change the viewing angle of the image light beam passing therethrough. As a result, the viewing angle of the image light beam is magnified from a small angle $\ominus$ (such as ±1 degree) to a large angle $\Phi$ (such as ±30 degrees). The ratio of the angle $\ominus$ to the angle $\Phi$ equals to the ratio of the first focal length $f_a$ to the second focal length $f_b$.

As shown in FIG. 2, with the arrangement of the angle-magnifying screen 14, viewers in multi-position of the viewing area 90 is able to watch stereoscopic images from the multi-view auto-stereoscopic display 1. However, for an image light beam which strikes the Fresnel lens 60 at a large incident angle, a chromatic aberration will occur after the image light beam passes through the Fresnel lens 60. The chromatic aberration is magnified further by the first lens unit 20 and the second lens unit 40 and causes a degradation of image quality. In addition, due to a number of grooves formed on a surface of the Fresnel lens 60, the image passing though it may exhibit a Moire pattern or a groove pattern.

In order to prevent the problems mentioned above, different embodiments of an angle-magnifying screen are provided in the following descriptions.

Figure 3:
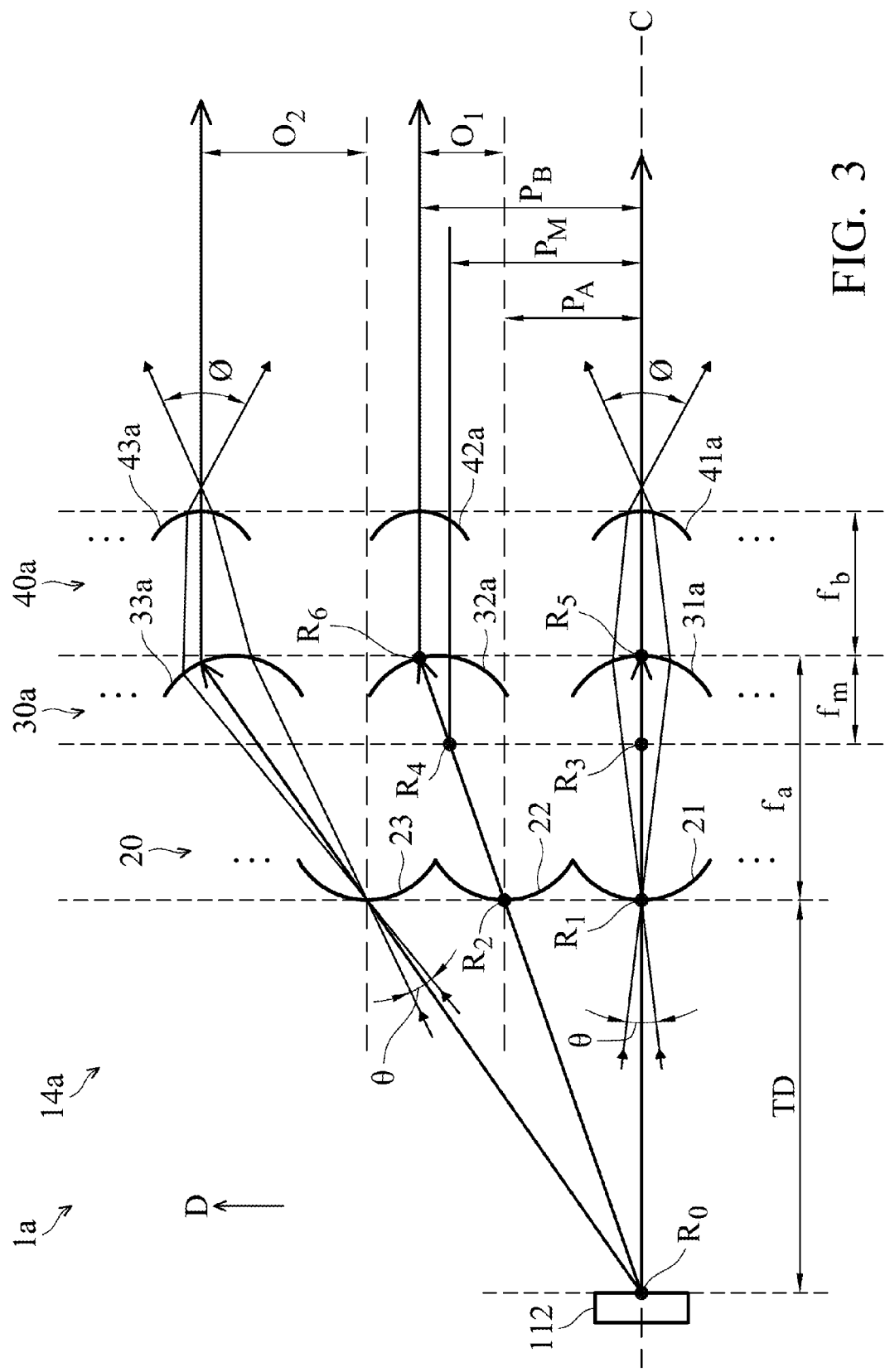
FIG. 3 shows a structural schematic view of a portion of a multi-view auto-stereoscopic display, in accordance with some embodiments.

FIG. 3 shows a structural schematic view of a portion of a multi-view auto-stereoscopic display 1a, in accordance with some embodiments. It should be noted that a portion of the angle-magnifying screen 14a is not shown in FIG. 3. In the embodiments, similar elements which are shown in FIG. 2 are provided with the same reference numbers, and the features of similar elements are not reiterated in the interest of brevity. Differences between the multi-view auto-stereoscopic display 1a and the multi-view auto-stereoscopic display 1 shown in FIG. 2 include angle-magnifying screen 14 being replaced by angle-magnifying screen 14a.

In some embodiments, the angle-magnifying screen 14a includes a first lens unit 20, a central lens unit 30a, and one or more second lens units 40a. The first lens unit 20, the central lens unit 30a, and the second lens unit 40a are arranged sequentially along the main axis C. The first lens unit 20 includes a plurality of first lenticular lenses, such as first lenticular lenses 21, 22, and 23, arranged along a predetermined direction D. Each of the first lenticular lenses 21, 22, and 23 has a first focal length $f_a$ and is projected toward a light-receiving side of the angle-magnifying screen 14. The optical axis of the first lenticular lens 21 aligns with the main axis C, and the optical axes of each two neighboring first lenticular lenses 21, 22, and 23 are spaced apart by a first distance $P_A$.

The central lens unit 30a includes a plurality of central lenticular lenses, such as central lenticular lenses 31a, 32a, and 33a, arranged along the predetermined direction D. Each of the central lenticular lenses 31a, 32a, and 33a has a third focal length $f_m$. The optical axis of the central lenticular lens 31a aligns with the main axis C, and the optical axis of each two neighboring central lenticular lenses 31a, 32a, and 33a are spaced apart by a third distance $P_M$. In some embodiments, the central lens unit 30a and the first lens unit 20 are spaced apart by a first focal length $f_a$, and the central lens unit 30a and the second lens unit 40a are spaced apart by a second focal length $f_b$. Additionally, the image light beams passing through the first lenticular lenses 21, 22, and 23 respectively passes through the focal points of the central lenticular lenses 31a, 32a, and 33a. As a result, the image light beams passing through the first lenticular lenses 21, 22, and 23 is directed by the central lenticular lenses 31a, 32a, and 33a to be transmitted along a direction parallel to the main axis C.

In some embodiments, as shown in FIG. 3, the projection lens 112 is arranged at a position $R_0$, and the first lenticular lenses 21 and 22 are respectively arranged at positions $R_1$ and $R_2$, and the focal points of central lenticular lens 31a and 32a are respectively arranged at positions $R_3$ and $R_4$. Since a triangle $R_1$, $R_2$, and $R_0$ and a triangle $R_3$, $R_4$, and $R_0$ are similar triangles, the third distance $P_M$ satisfies the following equation (1):

$$P_M = \frac{P_A}{TD} \times (TD + f_a - f_m) \quad (1)$$

in which TD is a projection length of the image light beam from the projection lens 112 to the angle-magnifying screen 14 (hereinafter referred to as projection length).

The second lens unit 40a includes a plurality of second lenticular lenses, such as second lenticular lenses 41a, 42a, and 43a, arranged along a predetermined direction D. Each of the second lenticular lenses 41a, 42a, and 43a has a second focal length $f_b$. The optical axis of the second lenticular lens 41a aligns with the main axis C, and the optical axes of each two neighboring second lenticular lenses 41a, 42a, and 43a are spaced apart by a second distance $P_B$. In some embodiments, the optical axis of each of the second lenticular lenses 41a, 42a, and 43a passes through a point of one of the corresponding central lenticular lenses 31a, 32a, and 33a at which the image light beam is emitted. As a result, the viewing angle of each image light beam from the central lenticular lenses 31a, 32a, and 33a is magnified.

For example, as shown in FIG. 3, the image light beam is emitted from the central lenticular lens 31a from a position $R_5$, and the optical axis of the second lenticular lens 41a passes through the position $R_5$. Additionally, the image light beam is emitted from the central lenticular lens 32a from a position $R_6$, and the optical axis of the second lenticular lens 41b passes through the position $R_6$. Since a triangle $R_1$, $R_2$, and $R_0$ and a triangle $R_5$, $R_6$, and $R_0$ are similar triangles, the second distance $P_B$ meets the following equation (2):

$$P_B = P_A * \frac{(TD + f_a)}{TD} \quad (2)$$

With the arrangement of the second lenticular lenses 41a, 42a, and 43a, the viewing angle of each image light beams from the central lenticular lens 31a, 32a, and 33a is magnified from a small angle $\ominus$ (such as ±1 degree) to a large angle $\Phi$ (such as: ±30 degrees). The ratio of the angle $\ominus$ to the angle $\Phi$ equals to the ratio of the first focal length $f_a$ to the second focal length $f_b$.

It should be noted that in equation (2) the second distance $P_B$ is greater than the first distance $P_A$. Therefore, in a direction away from the main axis C, the offset value between the optical axis of the first lenticular lens and the optical axis of the corresponding second lenticular lens is gradually increased. In some embodiments, along the predetermined direction D, the first lens unit 20 includes X first lenticular lenses counting from the first one of the first lenticular lenses which is adjacent to the first lenticular lens on the main axis C (hereinafter referred to as first axial lens). In addition, along the predetermined direction D, the second lens unit 40a includes X second lenticular lenses counting from the first one of the second lenticular lenses which is adjacent to the second lenticular lens on the main axis C (hereinafter referred to as second axial lens). The optical axis of a Y-th second lenticular lens is offset from the optical axis of a Y-th first lenticular lens by a shifting value, and the shifting value satisfies the following equation (3):

$$O_Y = Y*[P_B*N - P_A] \quad (3), \text{wherein } Y \leq X.$$

For example, as shown in FIG. 3, along the predetermined direction D, the first lens unit 20 includes two first lenticular lenses counting from the first one first lenticular lens 22 which is adjacent to the first axial lens 21 on the main axis C. In addition, along the predetermined direction D, the second lens unit 40a includes two second lenticular lenses counting from the first one second lenticular lens 42a which is adjacent to the second axial lens 41a on the main axis C. The optical axis of the second lenticular lens 42a (the $1^{st}$ second lenticular lens) is offset from the optical axis of the first lenticular lens 22 (the $1^{st}$ first lenticular lens) by a shifting value of $O_1 = P_B - P_A$. The optical axis of the second lenticular lens 43a (the $2^{nd}$ second lenticular lens) is offset from the optical axis of the first lenticular lens 23 (the $2^{nd}$ first lenticular lens) by a shifting value of $O_2=2*(P_B-P_A)$. It should be appreciated that the rest may be deduced by analogy.

Figure 4:
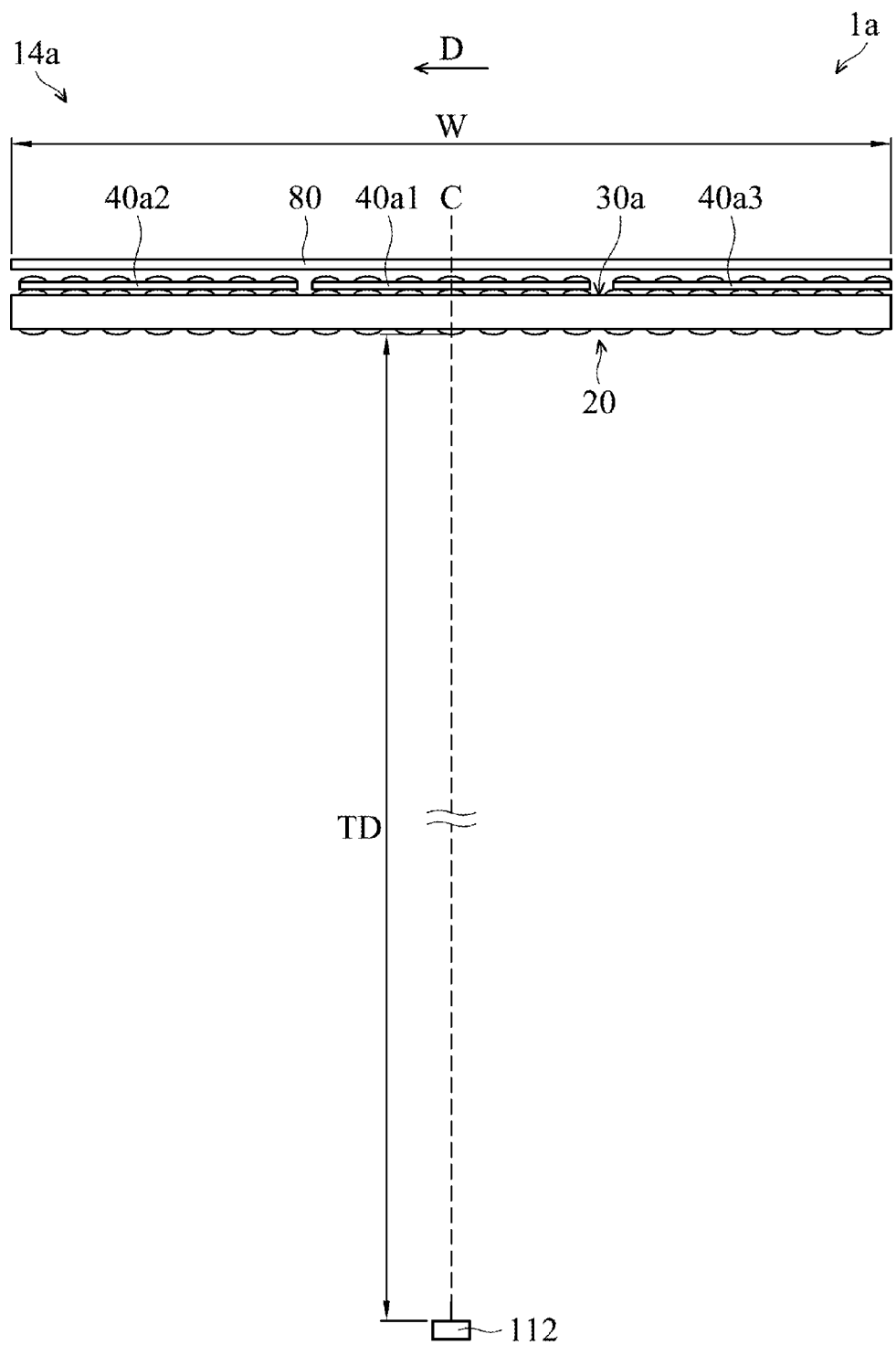
FIG. 4 shows a structural schematic view of a portion of a multi-view auto-stereoscopic display, in accordance with some embodiments.

Referring to FIG. 4, in some embodiments, the first lens unit 20 and the central lens unit 30a are two optical films. The surface of the first lens unit 20 which is opposite to the surface on which the first lenticular lenses are formed is connected to the surface of the central lens unit 30a which is opposite to the surface on which the central lenticular lenses are formed. The first lens unit 20 and the central lens unit 30a may be connected by any suitable process (such as gluing), so as to form a single optical sheet. Alternatively, the first lens unit 20 and the central lens unit 30a may be formed integrally.

In some embodiments, the angle-magnifying screen 14a includes a number of second lens units, such as second lens units 40a1, 40a2, and 40a3. The center of the second lens unit 40a1 aligns with the main axis C, and the second lens units 40a2 and 40a3 are respectively positioned at two sides of the second lens unit 40a1. Since each of the second lens units 40a1, 40a2, and 40a3 is independently positioned relative to the central lens unit 30a, the image quality of the angle-magnifying screen 14a is increased. Additionally, without sacrificing image quality, the machining allowance of the second lens units is increased, and therefore the manufacturing cost is reduced.

In some embodiments, the number of first lenticular lenses of the first lens unit 20 equals the number of pixels of the multi-view auto-stereoscopic display 1a (such as 1920*1080). In addition, the number of central lenticular lenses of the central lens unit 30a equals the number of first lenticular lenses of the first lens unit 20. Moreover, the number of second lenticular lenses of the second lens unit 40a equals the number of first lenticular lenses of the first lens unit 20. In operation, the first lenticular lenses of the first lens unit 20 are arranged at a side of the angle-magnifying screen 14a facing to the projection lens 112. The central lenticular lens of the central lens unit 30a and the second lenticular lenses of the second lens unit 40a are arranged at the side of the angle-magnifying screen 14a that faces away from the projection lens 112. With these arrangements, the optical feature of each pixel of the multi-view auto-stereoscopic display 1a is adjusted.

It should be noted that in equation (3) as the value Y increases, the shifting value $O_Y$ increases accordingly. Therefore, in some embodiments, the projection length TD of the image light beam from the projection lens 112 to the angle-magnifying screen 14a is selected with a value as large as possible to restrain the increase of the shifting value $O_Y$. Preferably, the projection length TD satisfies the following equation (4):

$$TD \geq f_d/O_Y * W/2 \quad (4)$$

in which W is a width of the first lens unit 20 in the predetermined direction D.

Figure 5:
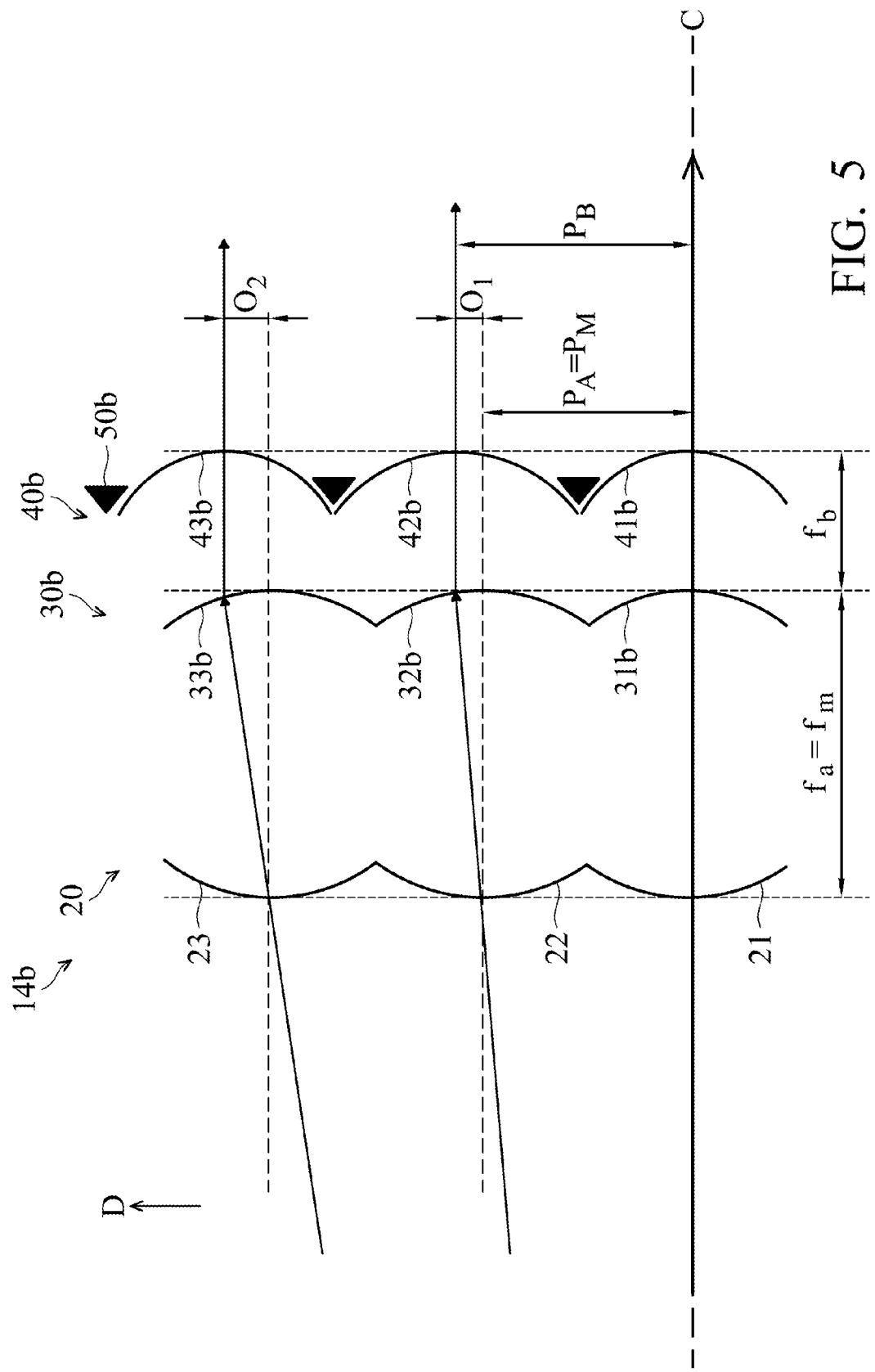
FIG. 5 shows a schematic view of a portion of a multi-view auto-stereoscopic display, in accordance with some embodiments.

FIG. 5 shows a structural schematic view of a portion of an angle-magnifying screen 14b, in accordance with some embodiments. In the embodiments, similar elements which are shown in FIG. 3 are provided with the same reference numbers, and the features of similar elements are not reiterated in the interest of brevity.

The angle-magnifying screen 14b includes a first lens unit 20, a central lens unit 30b, one or more second lens units 40b. The first lens unit 20, the central lens unit 30b, and the second lens unit 40b are arranged sequentially along the main axis C. The central lens unit 30b includes a number of central lenticular lenses, such as central lenticular lenses 31b, 32b, and 33b, arranged along a predetermined direction D. Each of the central lenticular lenses 31b, 32b, and 33b has a third focal length $f_{in}$. The optical axis of the central lenticular lens 31b aligns with the main axis C. The optical axes of each two neighboring central lenticular lenses 31b, 32b, and 33b are spaced apart by a third distance $P_B$, and the optical axes of the central lenticular lenses 31b, 32b, and 33b respectively align with the optical axes of the first lenticular lenses 21, 22, and 23.

The second lens unit 40b includes a number of second lenticular lenses, such as the second lenticular lenses 41b, 42b, and 43b, arranged along the predetermined direction D. Each of the second lenticular lenses 41b, 42b, and 43b has a second focal length $f_b$. The optical axis of the second lenticular lens 41b aligns with the main axis C, and the optical axes of each two neighboring second lenticular lenses 41b, 42b, and 43b are spaced apart by a second distance $P_B$. In some embodiments, the optical axis of each of the second lenticular lenses 41a, 42a, and 43a passes through a point of one of the corresponding central lenticular lenses 31b, 32b, and 33b at which the image light beam is emitted. As a result, the viewing angle of each image light beams from the central lenticular lens 31b, 32b, and 33b is magnified thereby. In some embodiments, the second distance $P_B$ also satisfies the equation (2) as mentioned above.

In some embodiments, the two neighboring second lenticular lenses are immediately adjacent to one another, and there is not flat surface formed therebetween. In some embodiments, the curvature of each second lenticular lens varies. For example, the curvature of the lenses arranged in a region adjacent to the main axis C is greater than the curvature of the lenses arranged in a region away from the main axis C. In some embodiments, as shown in FIG. 5, light between each two neighboring second lenticular lenses 41b, 42b, and 43b is blocked by a light blocking member 50b, so as to increase image contrast.

Figure 6:
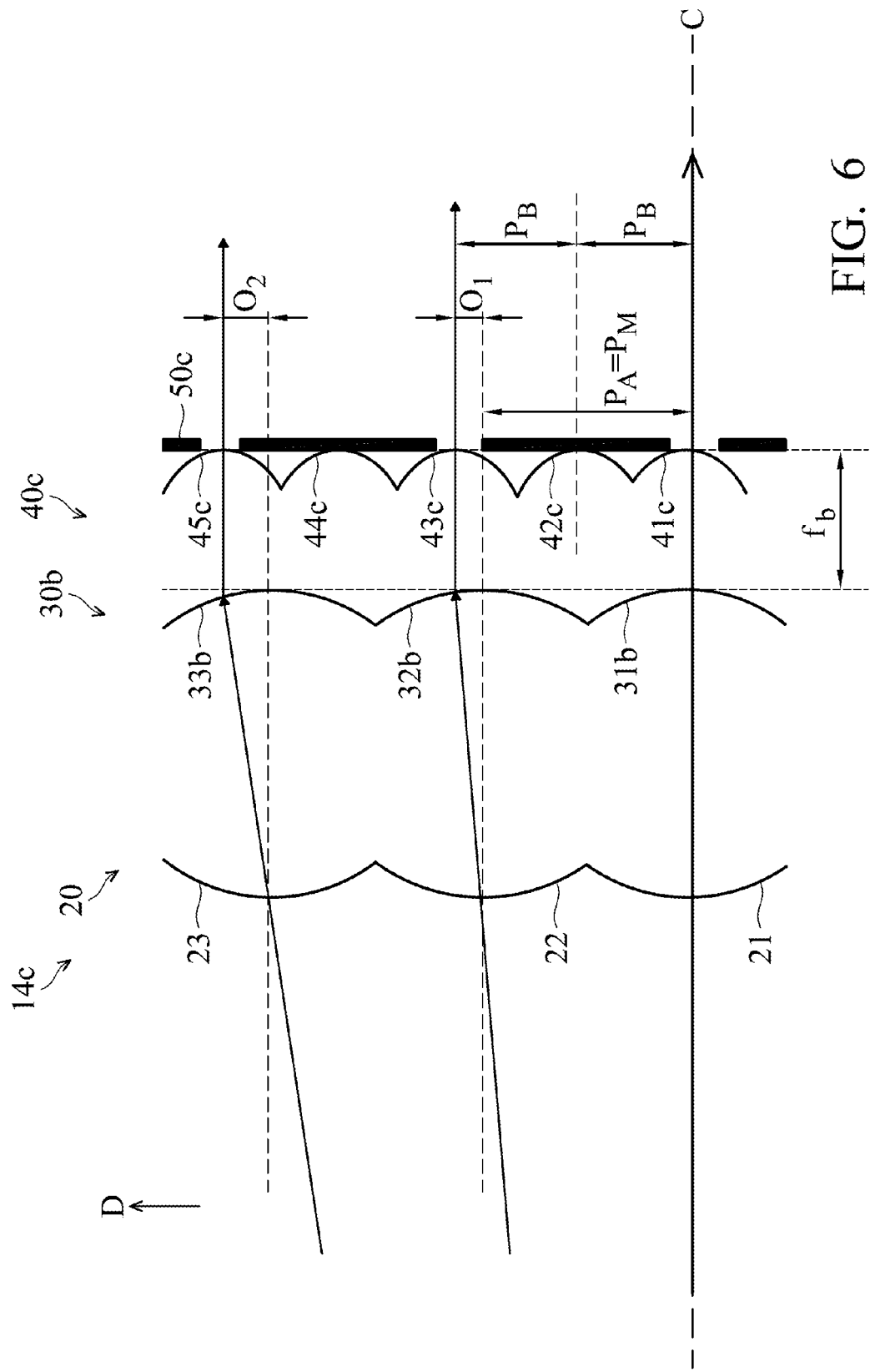
FIG. 6 shows a schematic view of a portion of a multi-view auto-stereoscopic display, in accordance with some embodiments.

FIG. 6 shows a structural schematic view of a portion of an angle-magnifying screen 14c, in accordance with some embodiments. In the embodiments, similar elements which are shown in FIG. 3 are provided with the same reference numbers, and the features of similar elements are not reiterated in the interest of brevity. The angle-magnifying screen 14c includes a first lens unit 20, a central lens unit 30b, one or more second lens units 40c. The first lens unit 20, the central lens unit 30b, and the second lens unit 40c are arranged sequentially along the main axis C.

The second lens unit 40c includes a plurality of second lenticular lenses, such as the second lenticular lenses 41c, 42c, 43c, 44c, 45c, and 46c, arranged along the predetermined direction D. Each of the second lenticular lenses 41c, 42c, 43c, 44c, 45c, and 46c has a second focal length $f_b$. The optical axis of the second lenticular lens 41c aligns with the main axis C, and the optical axes of each two neighboring second lenticular lenses 41c, 42c, 43c, 44c, 45c, and 46c are spaced apart by a second distance $P_B$. In some embodiments, the optical axis of each of the second lenticular lenses 41a, 43a, and 45a passes through a point of one of the corresponding central lenticular lenses 31c, 32c, and 33c at which the image light beam is emitted. As a result, the viewing angle of each image light beams from the central lenticular lens 31b, 32b, and 33b is magnified. In some embodiments, the second lenticular lens 42c is positioned between the second lenticular lenses 41c and 43c, and the second lenticular lens 44c is positioned between the second lenticular lenses 43c and 45c.

In some embodiments, the viewing angle of the image light beam from the central lens unit 30b is not magnified by the second lenticular lenses 42c and 44c. However, the arrangement of the second lenticular lenses 42c and 44c enables a simplification of the manufacturing process of the second lens unit 40c. For the purpose of illustration, in the following descriptions, the second lenticular lenses 41a, 43a, and 45a are referred to as "functional lenses", and the second lenticular lenses 42c and 44c are referred to as "structural lenses".

It should be appreciated that while in the embodiment shown in FIG. 6 there is only one structural lens is disposed between each two neighboring functional lenses, the disclosure should not be limited thereto. According to demands, a number of structural lenses can be arranged between each two neighboring functional lenses. As a result, the second distance $P_B$ satisfies the following equation (2)':

$$P_B = \frac{P_A}{N} * \frac{(TD + f_a)}{TD} \quad (2)'$$

in which N is the number of structural lenses between each two functional lenses.

In some embodiments, along the predetermined direction D, the first lens unit 20 includes X first lenticular lenses counting from the first one of the first lenticular lenses which is adjacent to the first lenticular lens on the main axis C (first axial lens). In addition, along the predetermined direction D, the second lens unit 40c includes X functional lenses counting from the first one of the functional lenses which is adjacent to the functional lens on the main axis C (second axial lens). The optical axis of a Y-th functional lens is offset from the optical axis of a Y-th first lenticular lens by a shifting value, and the shifting value satisfies the following equation (3)':

$$O_Y = Y*[P_B*N - P_A] \quad (3)', \text{ wherein } Y \leq X$$

For example, as shown in FIG. 6 along the predetermined direction D, the first lens unit 20 includes two first lenticular lenses counting from the first one first lenticular lenses 22 which is adjacent to the first axial lens 21 on the main axis C. In addition, along the predetermined direction D, the second lens unit 40c includes two functional lenses counting from the first one functional lens 43c which is adjacent to the second axial lens 41c on the main axis C. The optical axis of the second lenticular lens 43c (the $1^{St}$ functional lens) is offset from the optical axis of the first lenticular lens 22 (the $1^{st}$ first lenticular lens) by a shifting value of $O_1 = P_B*2 - P_A$. The optical axis of the second lenticular lens 45c (the $2^{nd}$ functional lens) is offset from the optical axis of the first lenticular lens 23 (the $2^{nd}$ first lenticular lens) by a shifting value of $O_1 = 2*(P_B*2 - P_A)$. It should be appreciated that the rest may be deduced by analogy.

Embodiments of a multi-view auto-stereoscopic display are disclosed. By using an angle-magnifying screen to magnify, the viewing angle of an image light beam projected from a projection lens of the multi-view auto-stereoscopic display is magnified. As a result, stereoscopic images are observed by viewers in different positions of a viewing area. In some embodiments, since the angle-magnifying screen magnifies the viewing angle of the image light beam by using of a central lens unit rather than a Fresnel lens, image quality of the multi-view auto-stereoscopic display is further improved.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An angle-magnifying screen, adapted to receive an image light beam from a projection lens, the angle-magnifying screen comprising:
   a first lens unit, comprising a plurality of first lenticular lenses each having a first focal length, wherein the first lenticular lenses are arranged along a predetermined direction and are separated from one another by a first distance;
   a second lens unit, comprising a plurality of second lenticular lenses each having a second focal length, wherein the second lenticular lenses are arranged along the predetermined direction and are separated from one another by a second distance;
   a central lens unit, positioned between the first lens unit and the second lens unit and separated from the first lens unit by a distance of the first focal length,
   wherein the central lens unit comprises a plurality of central lenticular lenses each having a third focal length, and the central lenticular lenses arranged along the predetermined direction and separated from one another by a third distance, wherein the third distance satisfies the following equation:

$$P_M = \frac{P_A}{TD} \times (TD + f_a - f_m)$$

in which $P_M$ is the third distance, $P_A$ is the first distance, TD is a projection length of the image light beam from the projection lens to the angle-magnifying screen, $f_a$ is the first focal length, and $f_m$ is the third focal length.

2. The angle-magnifying screen as claimed in claim 1, wherein the second distance satisfies the following equation:

$$P_B = \frac{P_A}{N} * \frac{(TD + f_a)}{TD}$$

in which N is a natural number greater than or equal to 1.

3. The angle-magnifying screen as claimed in claim 1, wherein the first lenticular lenses comprise a first axial lens, and the second lenticular lenses comprise a second axial lens, wherein the optical axis of the first axial lens and the optical axis of the second axial lens are arranged in a main axis.

4. The angle-magnifying screen as claimed in claim 3, wherein along the predetermined direction, the first lens unit comprises X first lenticular lenses counting from the first one of the first lenticular lenses which is adjacent to the first axial lens, and
   wherein along the predetermined direction, the second lens unit comprises X second lenticular lenses counting from the first one of the second lenticular lenses which is adjacent to the second axial lens,
   wherein the optical axis of a Y-th second lenticular lens is offset from the optical axis of a Y-th first lenticular lens by a shifting value, and the shifting value satisfies the following equation:

$$O_Y = Y*[P_B*N - P_A]$$

in which Oy is the shifting value, Y is smaller than or equal to X, and N is a natural number greater than or equal to 1.

5. The angle-magnifying screen as claimed in claim 4, wherein a projection length of the image light beam from the projection lens to the angle-magnifying screen satisfies the following equation:

$$TD \geq f_a/O_Y * W/2$$

in which W is a width of the first lens unit along the predetermined direction.

6. The angle-magnifying screen as claimed in claim 1, wherein the first focal length equals to the third focal length.

7. The angle-magnifying screen as claimed in claim 1, wherein the first focal length is greater than the second focal length.

8. The angle-magnifying screen as claimed in claim 1 wherein the central lens unit is spaced from the second lens unit by a distance of the second focal length.

9. The angle-magnifying screen as claimed in claim 1, further comprising a plurality of light blocking elements each positioned between the two neighboring lenticular lenses.

10. The angle-magnifying screen as claimed in claim 1, comprising a plurality of second lens units, and the second lens units are adjacent to one another along the predetermined direction.

11. A multi-view auto-stereoscopic display, comprising:
  a projection lens, configured to receive an image light beam; and
  an angle-magnifying screen, configured to receive the image light beam from the projection lens and comprising:
    a first lens unit, comprising a plurality of first lenticular lenses each having a first focal length, wherein the first lenticular lenses are arranged along a predetermined direction and are separated from one another by a first distance;
    a second lens unit, comprising a plurality of second lenticular lenses each having a second focal length, wherein the second lenticular lenses are arranged along the predetermined direction and are separated from one another by a second distance;
    a central lens unit, positioned between the first lens unit and the second lens unit and separated from the first lens unit by a distance of the first focal length,
    wherein the central lens unit comprises a plurality of central lenticular lenses each having a third focal length, and the central lenticular lenses are arranged along the predetermined direction and separated from one another by a third distance, wherein the third distance satisfies the following equation:

$$P_M = \frac{P_A}{TD} \times (TD + f_a - f_m)$$

in which $P_M$ is the third distance, $P_A$ is the first distance, TD is a projection length of the image light beam from the projection lens to the angle-magnifying screen, $f_a$ is the first focal length, and $f_m$ is the third focal length.

12. The multi-view auto-stereoscopic display as claimed in claim 11, wherein the first lens unit and the central lens unit are formed integrally, the first lens unit is at a side of the angle-magnifying screen that is close to the projection lens, and the central lens is at a side of the angle-magnifying screen that is away from the projection lens.

13. The multi-view auto-stereoscopic display as claimed in claim 11, wherein the angle-magnifying screen comprises a plurality of second lens units, and the second lens units are adjacent to one another along the predetermined direction.

* * * * *